F. H. VAN HOUTEN.
LUBRICATING DEVICE FOR DOUGH HOPPERS.
APPLICATION FILED APR. 4, 1916.

1,293,256.

Patented Feb. 4, 1919.
2 SHEETS—SHEET 1.

Inventor
Frank H. Van Houten

By Church & Church
His Attorneys

F. H. VAN HOUTEN.
LUBRICATING DEVICE FOR DOUGH HOPPERS.
APPLICATION FILED APR. 4, 1916.
1,293,256. Patented Feb. 4, 1919.
2 SHEETS—SHEET 2.
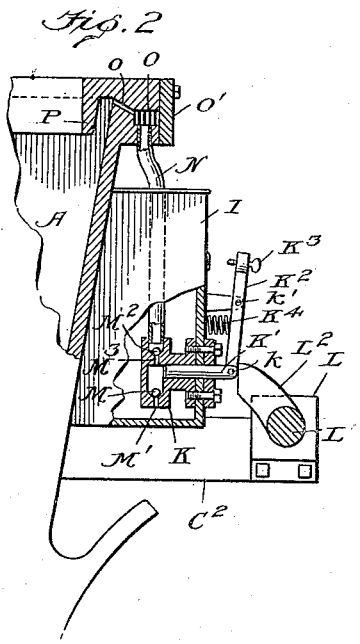
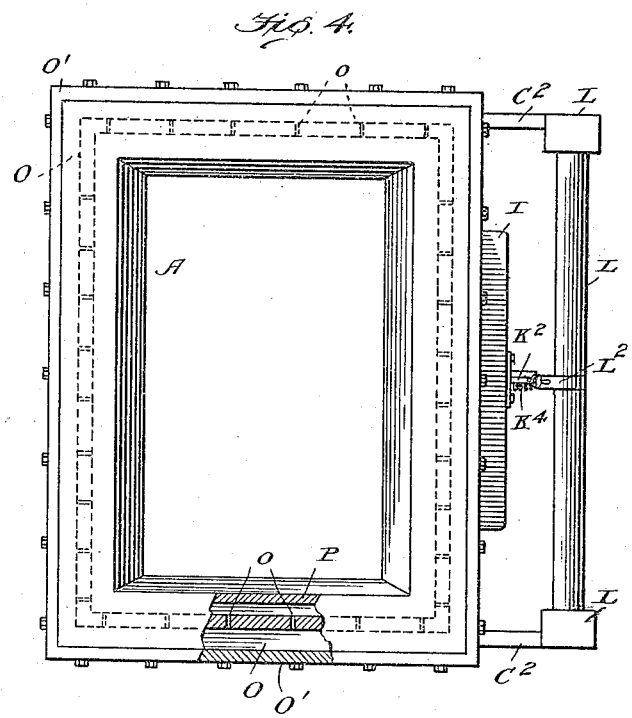
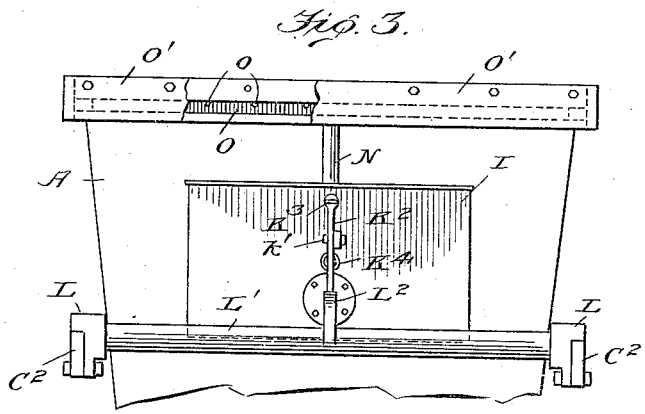

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

LUBRICATING DEVICE FOR DOUGH-HOPPERS.

1,293,256.   Specification of Letters Patent.   Patented Feb. 4, 1919.

Application filed April 4, 1916. Serial No. 88,890.

*To all whom it may concern:*

Be it known that I, FRANK H. VAN HOUTEN, a citizen of the United States, residing at Beacon, in the county of Dutchess and State of New York, have invented certain new and useful Improvements in Lubricating Devices for Dough-Hoppers; and I do hereby declare the following to be a full, clear, and exact description of the same, reference being had to the accompanying drawings, forming part of this specification.

The object of this invention is the provision of an improved means for applying a lubricant to the interior of a hopper, for example, the hopper of a dough dividing machine in which masses of dough are divided into portions of the proper size for the formation of loaves of bread, but it will be understood that the novel features of the invention are capable of general application to hoppers and the like, regardless of the subsequent treatment of the substance therein confined.

A full understanding of the invention will be attained from the ensuing detailed description, when taken in connection with the accompanying drawings which illustrate a structural embodiment of the invention in a preferred form. The novel features of the invention will be pointed out in the claims at the end of the specification.

In the drawings,—

Fig. 2 is a side elevation, partly in section, of the dough hopper and means for applying a lubricant to the side walls thereof, the view being on a larger scale than that of Fig. 1.

Fig. 3 is a front elevation of the same.

Fig. 4 is a top plan view of the same.

Like characters of reference in the several figures indicate the same parts.

Figure 1:
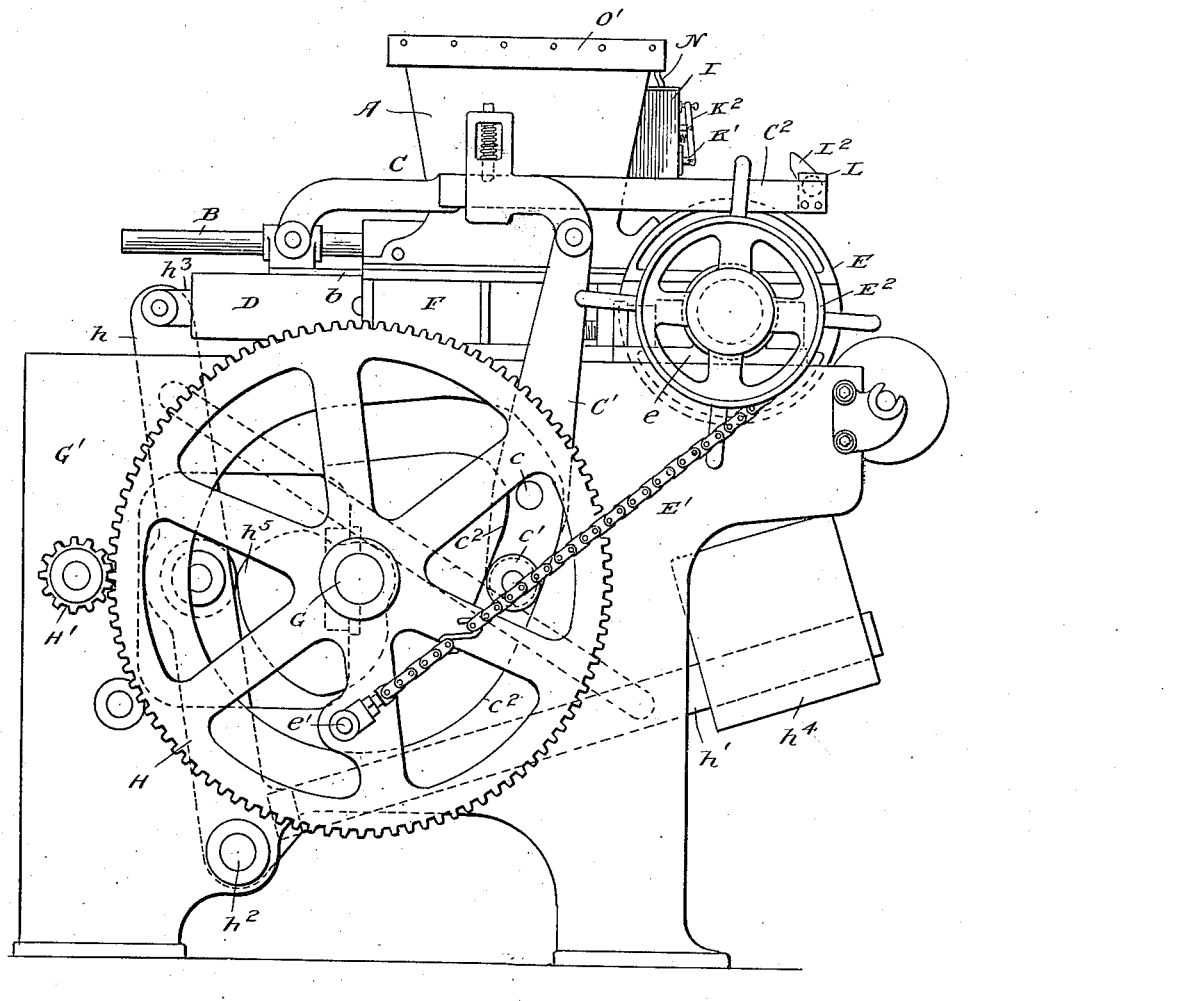
Figure 1 is a side elevation of one type of dough dividing machine provided with the present improvements.

The dough dividing machine adopted for illustrating the present invention is of the general type disclosed in my prior Patent No. 1,158,339, dated October 26, 1915, and other prior patents granted to me. As shown in Fig. 1, the machine embodies a hopper A into which the dough to be divided is deposited, and in the bottom of the said hopper there is a reciprocatory cut-off or knife $b$ connected with a knife stem B. Below the cut-off or knife $b$ there is a reciprocatory plunger or head D adapted to advance the dough deposited in the pressure chamber F, to the measuring cylinder E and to force the same into the pockets in said cylinder at a substantially predetermined pressure. This system of operation is well known in my prior patents and may be briefly described, as follows:

A cam shaft G is journaled in the frame G' of the machine and receives motion through the medium of a large gear wheel H at one end of the frame. The gear wheel H is in mesh with a pinion H' forming part of a train of drive gearing, not shown. A weighted bell crank lever formed by the arms $h$, $h'$ is mounted on a transverse shaft $h^2$, the arm $h$ being pivotally connected by a link connection $h^3$ with the rear end of the plunger D. On the arm $h'$ of the bell crank lever is mounted an adjustable weight $h^4$. The weight $h^4$ serves as the means for advancing the plunger and dough to force the dough into the pockets of the measuring cylinder and a cam $h^5$ on the shaft G serves as the means for retracting the plunger and elevating the weight $h^4$. The knife or cut-off $b$ is operated to reciprocate in accord with the movements of the plunger D by a train of links C connected at one end with the knife stem B and at the opposite end with the upper ends of lever arms C' connected by a shaft $c$ journaled in the main frame. One of said lever arms has at its lower end a projection or roller $c'$ adapted to coöperate with a cam groove $c^2$ on the inner face of the gear H.

The measuring cylinder E having chambers or pockets therein for the reception of the dough is journaled in bearings $e$ in the main frame, and at one end is provided with means whereby it is given an intermittent rotary movement, in the present machine each movement corresponding to substantially one-half of a revolution. The mechanism for rotating the cylinders is similar to that now in use, and, stated briefly, it embodies a chain or flexible connection E' connected at one end with a crank pin $e'$ on the gear wheel H, and at the opposite end with a drum or pulley $E^2$ journaled on the end of the cylinder E and adapted to connect therewith through a pawl and ratchet mechanism not illustrated herein.

The present invention is particularly concerned with the provision of means for lubricating the inner walls of the hopper A, and it is the object to supply lubricant to said walls in such manner that, while a sufficient quantity is supplied to prevent sticking of the dough to the walls of the hopper and permit easy gravital discharge of the dough into the pressure chamber F beneath the hopper, the walls of the hopper will never be flooded with an unnecessary quantity of lubricant. Flooding the walls of the hopper with lubricant is not only wasteful, but the presence of the lubricant in large quantities has a perceptible deleterious action on the masses of dough within the hopper.

Referring now more particularly to Figs. 2 and 4, inclusive: At one end of the hopper A, there is provided a suitable reservoir or chamber I mounted in the present instance on the end wall of the hopper and adapted to receive a supply of a lubricant suitable for contact with masses of dough, such as a vegetable oil, melted lard or butter and the like. Within the reservoir I and bolted to the rear wall thereof is a suitable pump K, the cylinder of which is provided with a reciprocatory piston K' extending through the outer wall of the reservoir I. The outer end of pump piston K' is pivoted at $k$ to the lower end of an operating lever K² pivoted at $k'$ to a bracket on the wall of the reservoir I. The upper end of the operating lever K² is provided with an adjustable stop screw K³ which is adapted to limit the movement of the upper end of said lever toward the wall of the reservoir I. A spring K⁴ interposed between the operating lever K² and the wall of the reservoir I exerts pressure on the lower end of said operating lever to force the latter outwardly from the wall of the reservoir I and thereby retract the piston K' within the cylinder of the pump. The piston of the pump is advanced in the cylinder by inward movement of the lower end of said operating lever K² toward the reservoir, this inward movement in the present embodiment being effected while the plunger D and knife $b$ are retracting after discharge of the dough into the measuring cylinder, through the medium of the following connections: Secured to the rearwardly-projecting bars C² of the link connections C in any suitable manner, for example, by means of heads L mounted on the respective bars is a transverse casting or bar L' having a finger L² located on the casting in position to engage the lower end of the operating lever K², when the knife stem B is retracted, in the operation of the machine, and thereby to push the lower end of said operating lever toward the wall of the reservoir I and advance the piston K' of the pump. Any suitable types of valves may be employed, for drawing a charge of lubricant from the reservoir into the cylinder of the pump and for discharging the charge of lubricant at the outlet from which it is subsequently conducted for distribution to the inner walls of the hopper A. In the present instance, the inlet valve consists of a valve body M seating over the inlet M' during the advance of the piston K' and adapted to be withdrawn by the suction of the piston during the retraction of the latter. The outlet valve consists of a similar valve body M² seating over the outlet M³ during the retraction of the piston, while a charge of lubricant is being drawn into the cylinder through the inlet and the said valve body M² is forced from its seat during the advance or forward stroke of the piston, by the pressure of the piston, to permit escape of the fluid through the outlet M³.

A supply pipe N conducts the charges of fluid from the pump K to the proper points for distribution to the inner walls of the hopper A. The receiver for the lubricant is located at the upper end of said hopper and consists preferably of a groove O formed on the outer side of the walls of the hopper. In the present instance, said groove extends all the way around the hopper. The groove O forms a continuous passage, receiving oil discharged by the pump, the lower end of the pipe N being connected with the discharge outlet of the pump and upper end of said pipe connected with the groove O. The outer open sides of the groove may be closed by means of plates O', preferably detachably secured to the outer side of the hopper walls, as shown more particularly in Figs. 2 to 4 inclusive. At intervals along the groove O, ducts $o$ connect the groove O with the interior of the hopper. These ducts $o$ are preferably substantially equally spaced with relation to each other and inclined upwardly toward their ends which discharge into the interior of the hopper, whereby the force of the pump is necessary to cause the lubricant to flow into the hopper. The lubricant discharged into the hopper will also be equally and uniformly distributed over the inner walls thereof. At the top of the hopper, there is provided a deflector or hood P depending into the hopper and extending around the sides thereof. The bottom of the hood P is located beneath the discharge ends of the ducts $o$, so as to prevent the dough in the hopper from covering the ducts and clogging them. If, however, the ducts become clogged from any cause, the closures or plates O' may be removed, permitting the ducts to be cleaned by inserting a wire into the ducts from the outside of the hopper.

With the above construction, on the forward stroke of the plunger D and knife $b$, wherein a charge of dough previously deposited in the pressure chamber F is advanced into the pockets of the measuring cylinder E, and simultaneously the knife $b$ cuts off communication between the lower end of the hopper A and the pressure chamber F, the advance movement of the bars C² of the knife operating links will move the finger L² of the cross bar or casting L' away from the operating lever K² of the pump K. This permits the spring K⁴ to act, advancing the lower end of said operating lever away from the wall of the reservoir I, thereby retracting the piston K' in the cylinder of the pump, so as to draw a charge of lubricant through the inlet M' into the cylinder of the pump. During the above described movement of the piston K' the valve body M² is held firmly over the outlet M³ by the suction of the retracting piston. On the reverse movement of the plunger D and knife b, finger L² will be moved into contact with the lower end of operating lever K², pushing the lower end of said lever K² toward the rear wall of the reservoir I against the tension of spring K⁴ and advancing the piston K'. The advance of the piston K' will force the valve body M on its seat, closing inlet M', and simultaneously force valve body M² away from its seat, opening the outlet M³. The charge of lubricant previously drawn into the cylinder of the pump, during the previously described retraction of the piston, will thus be discharged through the supply pipe N to the groove O extending around the upper end of the dough hopper A, and forced through the equally spaced small ducts o into the interior of the hopper. At each advance stroke of the piston, a small amount of lubricant will be discharged through the several ducts o thereby effecting intermittently the distribution of a small quantity of lubricant equally around the inner walls of the hopper A. The positive feed of the lubricant provided by the present invention insures against flooding of the interior of the hopper with lubricant, and, at the same time, a sufficient quantity will be discharged at each feeding interval to efficiently lubricate the sides of the hopper and prevent the masses of dough from sticking thereto. In actual practice, the groove O will be normally filled with lubricant, and the quantity discharged into the hopper through the ducts o at a single operation will be determined by excess amount of lubricant discharged by the pump into the groove O during a single advance movement of the piston. This insures a discharge simultaneously from all the ducts o. By adjusting the screw stop K³, the distance the piston is retracted by the spring K⁴ may be varied and thus the quantity of lubricant drawn into the cylinder and finally discharged through the ducts o may be regulated.

What is claimed is:

1. In a dough dividing machine, the combination with the hopper, of means adapted to be intermittently retracted and advanced to open and close the discharge end of the hopper, operating mechanism therefor, a duct for discharging lubricant into the interior of the hopper, a source of supply, and means for feeding lubricant from the source of supply to the duct, said feeding means being controlled by the operating mechanism whereby the lubricant is supplied to the duct only when the machine is in operation.

2. In a dough dividing machine, the combination with the hopper, of means adapted to be intermittently retracted and advanced to open and close the discharge end of the hopper, operating mechanism therefor, a duct for discharging lubricant into the interior of the hopper, a source of supply, means for feeding lubricant from the source of supply to the duct, and means for establishing connections between the feeding means and operating mechanism for actuating the feeding means only when the machine is in operation, whereby the supply of lubricant is controlled by the operation of the machine.

3. In a dough dividing machine, the combination with the hopper, of means adapted to be intermittently retracted and advanced to open and close the discharge end of the hopper, operating mechanism therefor, a duct for discharging lubricant into the interior of the hopper, a source of supply, and a pump for forcing lubricant from the source of supply to the duct, said pump being controlled by the operating mechanism whereby lubricant is supplied to the duct only when the machine is in operation.

4. In a dough dividing machine, the combination with the hopper, of means adapted to be intermittently retracted and advanced to open and close the discharge end of the hopper, operating mechanism therefor, a duct for discharging lubricant into the interior of the hopper, a source of supply, a pump for forcing lubricant from the source of supply to the duct, and means for establishing connections between the operating mechanism and the pump only when the machine is in operation, whereby the supply of lubricant is controlled by the operation of the machine.

5. In a dough dividing machine, the combination with the hopper, of means adapted to be intermittently retracted and advanced to open and close the discharge end of the hopper, operating mechanism therefor, a duct for discharging lubricant into the interior of the hopper, a source of supply located below the duct, and means for feeding lubricant from the source of supply to the duct, said feeding means being controlled by the operating mechanism whereby lubricant is fed to the duct only when the machine is in operation.

6. A lubricating device for hoppers such as described, comprising a main duct extending around a hopper and provided with a plurality of substantially equally spaced elongated discharge ducts leading from the main duct to the interior of the hopper whereby lubricant may be discharged uniformly into said hopper, said discharge ducts being inclined upwardly toward their discharge ends, a source of lubricant supply, and means for feeding lubricant under pressure from said source of supply to said main duct, to force lubricant through the discharge ducts into the interior of the hopper.

7. In combination, a dough hopper provided with a lubricant-receiving groove formed in the outer face of the hopper wall and extending around the hopper, ducts leading from said groove to the interior of the hopper, a closure wall for the lubricant-receiving groove secured to the outer face of the hopper wall, a source of lubricant supply, and means for feeding lubricant under pressure from said source of supply to said groove.

8. In combination, a dough hopper provided with a lubricant-receiving groove formed in the outer face of the hopper wall and extending around the hopper, ducts leading from said groove to the interior of the hopper, a closure wall for the lubricant-receiving groove secured to the outer face of the hopper wall, a source of lubricant supply located beneath the lubricant-receiving groove, a supply pipe connecting said groove with the source of supply, and a pump operable intermittently to force lubricant under pressure from the source of supply through the supply pipe to the lubricant-receiving groove.

9. In a dough-dividing machine such as described, the combination with a hopper, of an intermittently operated cut-off at the discharge end of the hopper, a lubricant-receiver positioned to discharge lubricant into the interior of the hopper, a source of lubricant supply, and means operated by the cut-off for intermittently feeding lubricant to said receiver, whereby the supply of lubricant to the hopper is controlled by the discharge of dough from the hopper.

10. In a dough-dividing machine such as described, the combination with a hopper, of an intermittently operated reciprocatory cut-off at the discharge end of said hopper, a lubricant receiver positioned to discharge lubricant into the interior of the hopper, a source of supply, a reciprocatory pump for intermittently supplying lubricant from said source of supply to said receiver, and an operating connection between the cut-off and the pump, whereby the supply of lubricant to the hopper is controlled by the discharge of dough from the hopper.

11. In a dough-dividing machine, the combination with a hopper, of a cut-off adapted to be intermittently retracted and advanced to open and close the discharge end of said hopper, a lubricant receiver positioned to discharge lubricant into the interior of the hopper, a source of supply, a pump having a piston for forcing a supply of lubricant from said source of supply to said receiver, means for establishing a connection between the piston and the cut-off during the retraction of the cut-off to advance the piston of said pump and supply lubricant to said receiver, and a spring for automatically retracting the piston of the pump during the advance movement of the cut-off.

FRANK H. VAN HOUTEN.

Copies of this patent may be obtained for five cents each, by addressing the "Commissioner of Patents, Washington, D. C."